(12) United States Patent
Takimoto et al.

(10) Patent No.: US 6,335,857 B1
(45) Date of Patent: Jan. 1, 2002

(54) ELECTRIC DOUBLE LAYER CAPACITOR AND ELECTRODE THEREFOR

(75) Inventors: Yasuyuki Takimoto; Manabu Suhara, both of Yokohama; Takamichi Ishikawa, Kawasaki, all of (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/358,416

(22) Filed: Jul. 22, 1999

(30) Foreign Application Priority Data

Jul. 27, 1998 (JP) .......................................... 10-211487

(51) Int. Cl.$^7$ ................................................ H01G 9/00
(52) U.S. Cl. ........................ 361/502; 361/503; 29/25.03
(58) Field of Search ................................ 361/502, 503; 29/25.03; 264/331.14

(56) References Cited

U.S. PATENT DOCUMENTS 4,862,328 A   8/1989  Morimoto et al.
5,649,982 A * 7/1997  Halliop ..................... 29/25.03
5,682,288 A * 10/1997 Wani ......................... 361/502
5,877,935 A * 3/1999  Sato et al. ................. 361/502
6,104,600 A * 8/2000  Suhara et al. .............. 361/502

* cited by examiner

Primary Examiner—Dean A. Reichard
Assistant Examiner—Eric W. Thomas
(74) Attorney, Agent, or Firm—Oblon, Spivak, McClelland, Maeir & Neustadt, P.C.

(57) ABSTRACT

An electrode for an electric double layer capacitor, which is a sheet electrode comprising a carbonaceous material and a polytetrafluoroethylene and having a K value which is calculated by formula 1 from X-ray diffraction peak intensities measured by means of CuKα-radiation of at most 20:

$$K = I_{PTFE}/(I_{CARBON} \times (C_{PTFE}/C_{CARBON}))$$

where $I_{PTFE}$ is the X-ray diffraction peak intensity of the polytetrafluoroethylene in the vicinity of 2θ=18°, $I_{CARBON}$ is the X-ray diffraction peak intensity of the carbonaceous material in the vicinity of 2θ=43°, $C_{PTFE}$ is the concentration by weight of the polytetrafluoroethylene in the electrode, and $C_{CARBON}$ is the concentration by weight of the carbonaceous material in the electrode.

11 Claims, 1 Drawing Sheet

ELECTRIC DOUBLE LAYER CAPACITOR AND ELECTRODE THEREFOR

BACKGROUND OF THE INVENTION

1. Field of the Invention

The present invention relates to an electric double layer capacitor, particularly an electrode therefor.

2. Description of the Background

An electric double layer capacitor, especially a coin-shaped capacitor, employing an electric double layer formed at the interface between a polarizable electrode formed at the interface between a polarizable electrode and an electrolyte, has found a rapid increase in the demand as a memory backup power source in recent years. On the other hand, also in the field of application where a large capacity is required, such as, a power source for electric automobiles, it is desired to develop an electric double layer capacitor having a large capacity per unit volume, a low internal resistance, a high energy density and a high output density. Reduction of the internal resistance is desired also for the electric double layer capacitor to be used as a memory backup power source.

An electrode for an electric double layer capacitor is prepared e.g. by kneading an activated carbon powder into a slurry by means of a solvent for an electrolyte such as sulfuric acid, followed by press molding (U.S. Pat. No. 3,288,641). However, the electrode obtained by this method has a rigid porous structure and is susceptible to cracking or fracture and thus is not durable for use in a long period of time. Whereas, a carbon paste electrode has been proposed which is made of a viscous material having a binder of polytetrafluoroethylene optionally added to a mixture comprising an activated carbon powder and an electrolyte (JP-B-53-7025, JP-B-55-41015). This electrode is flexible and scarcely susceptible to cracking or fracture, but the shape-maintaining property is inadequate, and a cell having a special structure is required to supplement the strength for practical use.

Further, in order to obtain an electrode which is scarcely susceptible to cracking or fracture and excellent in the shape-maintaining property, a method has been proposed wherein a kneaded product comprising a carbonaceous material, a binder such as PTFE and a liquid lubricant, is preliminarily molded and then stretched or rolled to obtain an electrode molded in a sheet form (JP-A-63-107011, JP-A-2-235320). However, by this method, an electrode sheet having an adequately high strength even if the thickness is thin, can not be obtained, and there has been a problem from the viewpoint of the productivity or durability, when it is applied to an electrode for an electric double layer capacitor especially for a large capacity application.

The present invention has been made to solve the above mentioned conventional problems, and it is an object of the present invention to provide an electrode which has a high strength even in a sheet form having a thin thickness and which is useful for an electric double layer capacitor having a high capacitance density and a low internal resistance, particularly an electrode suitable for an electric double layer capacitor for a power application.

The present invention provides an electrode for an electric double layer capacitor, which is a sheet electrode comprising a carbonaceous material and a polytetrafluoroethylene and whereby K calculated by the following formula 1 from X-ray diffraction peak intensities measured by CuKα-ray is at most 33:

$$K = I_{PTFE}/(I_{CARBON} \times (C_{PTFE}/C_{CARBON})) \quad (1)$$

where $I_{PTFE}$ is the X-ray diffraction peak intensity of the polytetrafluoroethylene in the vicinity of $2\theta=18°$, $I_{CARBON}$ is the X-ray diffraction peak intensity of the carbonaceous material in the vicinity of $2\theta=43°$, $C_{PTFE}$ is the concentration by weight of the polytetrafluoroethylene in the electrode, and $C_{CARBON}$ is the concentration by weight of the carbonaceous material in the electrode.

BRIEF DESCRIPTION OF THE DRAWINGS

In the accompanying drawings, FIGS. 1a, b and c are graphs showing X-ray diffraction patterns of the electrodes of Examples 1 and 2 and Comparative Example 3.

DETAILED DESCRIPTION OF THE PREFERRED EMBODIMENTS

Figure 1A:
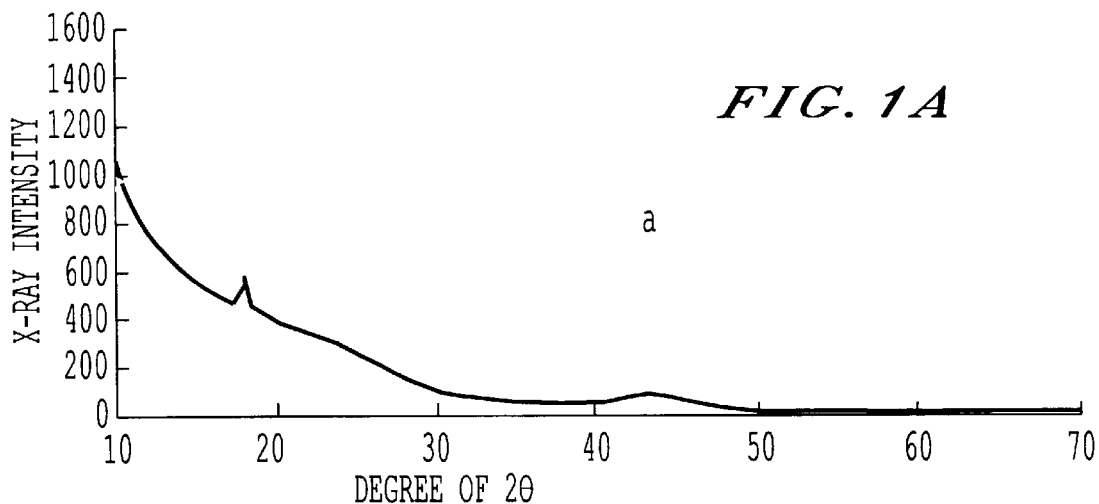

In the accompanying drawings, FIGS. 1a, b and c are graphs showing X-ray diffraction patterns of the electrodes of Examples and Comparative Example.

Now, the present invention will be described in detail with reference to the preferred embodiments.

In the present invention, as the X-ray diffraction apparatus, a commercially available powder X-ray diffraction apparatus is used whereby the measurement is carried out by means of CuKα-ray. The sheet electrode is set on a rotary test table in the form of a sheet without being pulverized. Even when the electrode is bonded to a current collector made of e.g. aluminum, it may be measured as it is. If a stress is exerted from the exterior to the electrode due to the pulverization or peeling from the current collector, the fibrous state of PTFE may change, so that the original state of the electrode may not be measured by the X-ray diffraction.

The measurement is carried out by θ/2θ scanning by a reflection method. Here, the sample is rotated in plane to remove an influence of an orientation. Here, θ and 2θ are used in a common sense in the X-ray diffraction. The scanning range is suitably from 10° to 70° as 2θ, when CuKα-ray is employed. In a diffraction pattern thus obtained, a PTFE peak is measured in the vicinity of $2\theta=18°$, and a peak of the (100) face of the non-crystalline carbonaceous material is measured in the vicinity of $2\theta=43°$. In the present invention, "in the vicinity of x°" represents a range from a (x−3) degree to a (x+3) degree.

In the present invention, the values for $I_{PTFE}$ and $I_{CARBON}$ in the Formula 1 represent the intensities of the peak tops having the influence of the background intensity eliminated. Especially, the peak of PTFE appears on a broad peak in the vicinity of $2\theta=24°$, attributable to the (002) plane of the carbonaceous material, and accordingly, it is necessary to eliminate the broad peak to obtain the peak intensity.

In the Formula 1 in the present invention, the value for $I_{PTFE}$ tends to be large when the PTFE is granular and tends to be small when PTFE is fibrous, and it is a numerical value showing an index of the fibrous degree. It is generally considered that the fiber-forming direction of PTFE is in the direction of c-axis of crystals, and if PTFE becomes fibrous to form fibers having a diameter of at most 0.1 μm, the crystal sizes in a direction perpendicular to the c-axis become substantially small, and as a result, $I_{PTFE}$ becomes small.

However, here, in order to compare data obtainable from different measuring apparatus, or to compare the fibrous degrees of PTFE among electrodes different in the mixing ratio of the carbonaceous material and PTFE in the electrodes or different in the film thicknesses or densities, it is necessary to standardize $I_{PTFE}$. One having such standardization carried out, is K represented by the Formula 1, and $C_{PTFE}/C_{CARBON}$ is a standardized factor of the mixing ratio of the carbonaceous material and PTFE, and $I_{CARBON}$ is a standardized factor of the diffraction apparatus, the film thickness and the density.

In the present invention, the peak for $I_{CARBON}$ is selected to be a peak of the (100) plane of the carbonaceous material. In the case of a non-crystalline carbonaceous material, the peak of the (002) plane is likely to change in the peak position or the intensity depending upon the method for preparation of the material, while the peak of the (100) plane has a relatively small change due to the material and is thus the most suitable as a standardized factor.

With the electrode of the present invention, the value of K represented by the Formula 1 is at most 33. If the value of K exceeds 33, PTFE is not adequately fibrous, and the strength of the electrode sheet is not adequately high. Especially when the thickness of the electrode sheet is made thin, the shape can not be maintained during the preparation of an electric double layer capacitor, and it is likely to deteriorate due to charge and discharge cycles. Further, PTFE which is present in the electrode in a granular form without becoming fibrous, tends to inhibit the electrical conductivity of the electrode, whereby the resistance of the electrode sheet tends to be high. It is particularly preferred that the value of K is at most 20.

In the present invention, the carbonaceous material is preferably a powder having a specific surface area of from 200 to 3,500 m$^2$/g, which is made of e.g. activated carbon, polyacene or carbon black. Further, fibers or powders of e.g. carbon fibers, carbon whiskers or graphite, may preferably be used. As the activated carbon, any one of phenol type, rayon type, acryl type, pitch type or coconut shell type, may be used, and it is preferred that the average particle size is from 0.1 to 100 μm, particularly from 1 to 20 μm, since the thickness of the electrode sheet can be made thin, and consequently the capacitance density of the electric double layer capacitor can be made high.

Carbon black may be used as a conductive material in admixture with other carbonaceous material. The average particle size of the carbon black is preferably from 0.001 to 1 μm, more preferably from 0.01 to 0.5 μm. Further, its specific surface area is preferably from 200 to 1,500 m$^2$/g, more preferably from 500 to 1,200 m$^2$/g.

In the present invention, an electrode comprising the above activated carbon, the above carbon black and PTFE, is particularly preferred, since it is thereby possible to maintain the internal resistance of an electric double layer capacitor to be low and the capacitance to be high.

PTFE in the present invention may be not only a homopolymer of tetrafluoroethylene, but also a copolymer obtainable by adding and copolymerizing other monomer to tetrafluoroethylene. If the polymer units derived from such other monomer in the copolymer, are at most 0.5 mol %, no melt flowability will be imparted to PTFE, and like a homopolymer of tetrafluoroethylene, it can be made fibrous, and an electrode sheet having a high strength and a low resistance, can be prepared. As such other monomer, hexafluoropropylene, chlorotrifluoroethylene, a perfluoro (alkyl vinyl ether), trifluoroethylene or a (perfluoroalkyl) ethylene, may, for example, be mentioned.

PTFE tends to be liquid or gel and can hardly be fibrous, if it is of a low molecular weight. Accordingly, preferably, it contains at least 50 wt % of a solid having a molecular weight of at least 1×10$^6$ as calculated from the standard specific gravity. Further, PTFE is preferably one obtained by emulsion polymerization, since such PTFE can readily be made fibrous.

The amount of PTFE contained in the electrode of the present invention is preferably from 1 to 40 wt %. If it is less than 1 wt %, the strength tends to be weak. If it exceeds 40 wt %, the internal resistance of the electrode tends to increase, even if PTFE is sufficiently fibrous, and the capacitance per unit weight of the electric double layer capacitor tends to be small. It is particularly preferably from 2 to 20 wt %.

As a method for producing the electrode of the present invention, a method may be mentioned in which a molded product obtained by paste extrusion molding or screw extrusion molding, is rolled to form a sheet electrode. To carry out the paste extrusion molding, rolling may be repeated to promote fiber-forming of PTFE, thereby to obtain the electrode of the present invention. Further, when the screw extrusion molding is carried out, the fiber-forming of PTFE is promoted by the screw extrusion, whereby the electrode of the present invention can be obtained by rolling in a small number of rolling operations as compared with the paste extrusion.

Further, in the case of the screw extrusion molding, extrusion molding can be continuously carried out, whereby a continuous extruded product elongated in the direction of extrusion, can be obtained, and an elongated electrode sheet can be obtained by rolling this extruded product. Especially by adjusting the rolling direction to the same direction as the extrusion direction of the screw extrusion, PTFE may be fibrillated longitudinally and transversely to form a three dimensional network structure, whereby even if the amount of PTFE is small, it is possible to form an electrode sheet having a high strength, and an increase of the electrode resistance by the addition of electrically insulating PTFE, is little, such being desirable.

The electrode sheet obtained by the present invention can be used for an electric double layer capacitor in the form of an electrode assembly having a current collector integrated therewith, for example, by bonding the electrode sheet to the current collector. As the current collector, a metal foil, particularly an aluminum foil, is preferred. The aluminum foil may be used as withdrawn from a rolled foil of an elongated foil, and an electrode sheet formed by the final rolling operation may be continuously integrated with the aluminum foil as it is formed, so that formation of the electrode and integration thereof with the aluminum foil can be carried out continuously in one line. If the electrode assembly is formed by such a continuous line, the production efficiency will be high.

Integration of the electrode sheet and the current collector is carried out preferably by interposing an adhesive therebetween, whereby they can be firmly integrated. Here, it is preferred to incorporate e.g. a highly conductive powder to the adhesive, so that the contact resistance between the electrode sheet and the current collector can be reduced. After the bonding of the electrode sheet and the current collector, they may further be subjected to rolling, so that they will be integrated more firmly. Such integration of the electrode sheet and the current collector may be carried out after molding the electrode sheet, followed by drying to remove the processing aid. Otherwise, the electrode sheet may bonded to the current collector in a semidried state, and after the rolling, the processing aid may be removed, whereby the electrode sheet and the current collector may readily be integrated by the rolling, such being desirable. The electrode sheet may be bonded to one side or both sides of the current collector.

The electric double layer capacitor of the present invention is one prepared in such a manner that a positive electrode and a negative electrode, each prepared by bonding the electrode sheet and the current collector as described above, are disposed to face each other with a separator interposed therebetween and accommodated together with a non-aqueous electrolyte in a container. In order to increase the capacitance, the electric double layer capacitor is preferably of a cylindrical type prepared in such a manner that a pair of positive and negative electrodes are molded in strip forms, then wound with a separator interposed therebetween and accommodated together with an electrolyte in a bottomed cylindrical container, or of an angular type prepared in such a manner that a plurality of rectangular positive and negative electrodes are alternately laminated with a separator interposed therebetween and accommodated in a bottomed angular container.

The non-aqueous electrolyte to be used for an electric double layer capacitor of the present invention, is not particularly limited, and a non-aqueous electrolyte containing a salt dissociable into ions in a known organic solvent, may be used. It is particularly preferred to use a non-aqueous electrolyte having dissolved in an organic solvent a salt comprising a quaternary onium cation represented by $R^1R^2R^3R^4N^+$ or $R^1R^2R^3R^4P^+$, wherein each of $R^1$, $R^2$, $R^3$ and $R^4$ which may be the same or different, is an alkyl group, and an anion such as $BF_4^-$, $PF_6^-$, $ClO_4^-$ or $CF_3SO_3^-$.

The above organic solvent is preferably a carbonate such as propylene carbonate, butylene carbonate or diethyl carbonate, a lactone such as γ-butylolactone, sulforane, or a mixed solvent thereof.

Now, the present invention will be described in further detail with reference to Examples. However, it should be understood that the present invention is by no means restricted to such specific Examples.

EXAMPLE 1

To a mixture comprising 80 wt % of a highly pure activated carbon powder having a specific surface area of 2,000 m$^2$/g and an average particle size of 10 μm, 7.5 wt % of carbon black and 12.5 wt % of a PTFE powder, 66 wt %, based on the total amount of the activated carbon powder and the carbon black, of propylene glycol was added and mixed. This mixture was subjected to screw extrusion by a single screw extruder having a barrel inner diameter of 40 mm using a full-flighted screw having a screw compression ratio of 1.6 and a nozzle designed so that the extruded product would be a cylindrical shape (outer diameter: 102 mm, inner diameter: 86 mm), at a barrel temperature of 80° C. and a nozzle temperature of 90° C. The extrusion pressure was 20 kg/cm$^2$.

The obtained extruded product was cut in the extrusion direction and made flat, and then rolled at a roll temperature of 80° C. and dried at 250° C. for 60 minutes to remove propylene glycol, to obtain an electrode sheet having a thickness of 157 μm and a density of 0.64 g/cm$^3$. The X-ray diffraction of this electrode sheet was measured to obtain the pattern shown in FIG. 1a. The heights of the peaks in the vicinity of 2θ=18° and 2θ=43°, were measured by eliminating the background. Especially, the peak in the vicinity of 2θ=43°, was broad, and accordingly, points at 2θ=36° and 2θ=51° of this pattern were connected by a linear line and taken as a background, to measure the peak in the vicinity of 2θ=43°. $I_{PTFE}$=52, $I_{CARBON}$=24, and the value of K was 15.4.

From this electrode sheet, a dumbbell test specimen of No. 1 as stipulated in JIS K6301, was punched out, and using the test specimen, the tensile strength was measured by a tensile tester at a measuring temperature of 23° C. at a tensile speed of 20 mm/min and with the initial distance between the grippings of the test piece being 70 mm. The tensile strength of this electrode sheet was 9.1 kg/cm$^2$.

An electrode sheet punched out to have an electrode area of 4 cm×6 cm, was bonded by a conductive adhesive to one side of a rectangular foil of pure aluminum having a width of 4 cm, a height of 6 cm and a thickness of 50 μm and having a lead terminal, followed by heating to thermoset the adhesive, to form an electrode assembly. Two sheets of such an electrode assembly were prepared, and the two sheets were disposed so that the electrode surfaces faced each other and sandwiched between two sheets of glass plates having a thickness of 2 mm, a width of 5 cm and a height of 7 cm, with a cellulose fiber separator having a thickness of 40 μm, interposed therebetween, to obtain an element.

As the electrolyte, a solution having 1.5 mol/l of triethylmonomethylammonium tetrafluoroborate dissolved in propylene carbonate, was used. The above element was heated in vacuum at 200° C. for 3 hours to remove impurities from the element, and the electrolyte was vacuum-impregnated thereto. The impregnated element was accommodated in an angular bottomed container made of propylene to obtain an electric double layer capacitor. The direct current resistance and the capacitance were measured at a current density of 20 mA/cm$^2$. The results are shown in Table 1.

EXAMPLE 2

Figure 1B:
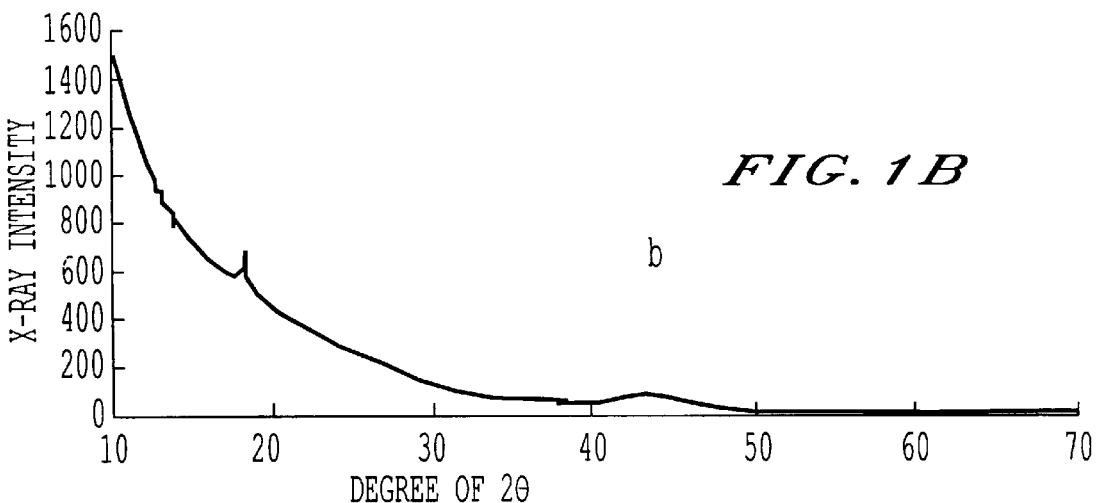

An electrode sheet having a thickness of 148 μm and a density of 0.64 g/cm$^3$ was prepared in the same manner as in Example 1 except that a highly pure activated carbon powder having a specific surface area of 1,500 m$^2$/g and an average particle size of 7 μm was used as the carbon material, and the weight ratio of the activated carbon, carbon black and PTFE was changed to 8:1:1. With respect to this electrode sheet, the same evaluation as in Example 1 was carried out. The X-ray diffraction pattern was as shown in FIG. 1b, and $I_{PTFE}$=52, $I_{CARBON}$=25, and K=18.7. Then, an electric double layer capacitor was prepared in the same manner as in Example 1 except that this electrode sheet was employed, and the same evaluation as in Example 1 was carried out. The results are shown in Table 1.

EXAMPLE 3 (COMPARATIVE EXAMPLE)

Figure 1C:
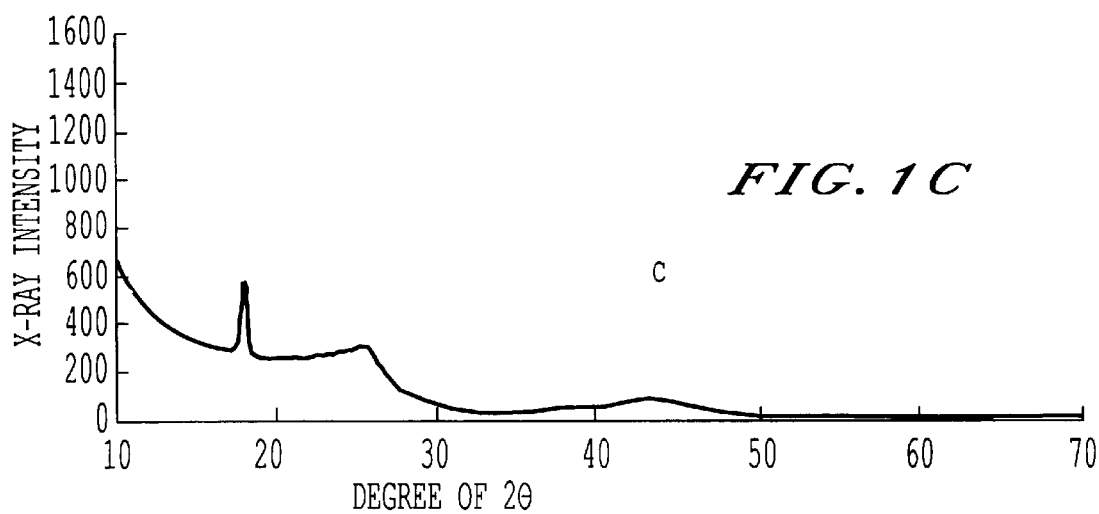

Using a highly pure activated carbon powder having a specific surface area of 1,200 m$^2$/g and an average particle size of 27 μm as the carbon material and acetylene black as the carbon black, the weight ratio of the activated carbon, the carbon black and PTFE was adjusted to be 8:1:1, and ethanol was added thereto in an amount of 60 wt % to the carbon material. This mixture was preliminarily molded into a rectangular shape and subjected to paste extrusion by means of a rectangular nozzle having an extrusion drawing ratio of 40. The obtained extruded product was rolled at a rolling temperature of 80° C. to obtain an electrode sheet having a thickness of 152 μm and a density of 0.69 g/cm$^3$. With respect to this electrode sheet, the same evaluation as in Example 1 was carried out. The x-ray diffraction pattern was as shown in FIG. 1c, and $I_{PTFE}$=244, $I_{CARBON}$=27, and K=103.9. Then, an electric double layer capacitor was prepared in the same manner as in Example 1 except that this electrode sheet was employed, and the same evaluation as in Example 1 was carried out. The results are shown in Table 1.

TABLE 1

| | Electrode sheet properties | | | | Capacitor properties | |
|---|---|---|---|---|---|---|
| | K | Thickness ($\mu$m) | Density (g/cm$^3$) | Tensile strength (kg/cm$^2$) | Internal resistance ($\Omega$) | Capacitance (F) |
| Ex. 1 | 15.4 | 157 | 0.64 | 9.1 | 9.8 | 0.592 |
| Ex. 2 | 18.7 | 148 | 0.64 | 11.4 | 8.6 | 0.496 |
| Ex. 3 | 103.9 | 152 | 0.69 | 1.2 | 23.0 | 0.429 |

In the electrode of the present invention, PTFE is sufficiently fibrous, whereby the resistance is low, the strength is high, and the thickness can easily be made thin. The electrode of the present invention is scarcely susceptible to cracking or fracture even if the thickness is thin, and is excellent in the shape-maintaining property. Accordingly, the electric double layer capacitor employing the electrodes of the present invention can be made to have a low internal resistance and a large capacitance per unit volume.

What is claimed is:

1. An electrode for an electric double layer capacitor, which is a sheet electrode comprising a carbonaceous material and a polytetrafluoroethylene and having a K value which is calculated by the following formula from X-ray diffraction peak intensities measured by means of CuK$\alpha$-radiation of at most 20:

$$K=I_{PTFE}/(I_{CARBON}\times(C_{PTFE}/C_{CARBON}))$$

where $I_{PTFE}$ is the X-ray diffraction peak intensity of the polytetrafluoroethylene in the vicinity of $2\theta=18°$, $I_{CARBON}$ is the X-ray diffraction peak intensity of the carbonaceous material in the vicinity of $2\theta=43°$, $C_{PTFE}$ is the concentration by weight of the polytetrafluoroethylene in the electrode, and $C_{CARBON}$ is the concentration by weight of the carbonaceous material in the electrode.

2. The electrode for an electric double layer capacitor according to claim 1, wherein the amount of the polytetrafluoroethylene contained in the electrode is from 1 to 40 wt %.

3. The electrode for an electric double layer capacitor according to claim 1, wherein the carbonaceous material is a powder having a specific surface area of from 200 to 3,500 m$^2$/g.

4. The electrode for an electric double layer capacitor according to claim 1, wherein the carbonaceous material comprises activated carbon having an average particle size of from 0.1 to 100 $\mu$m and carbon black having an average particle size of from 0.001 to 1 $\mu$m.

5. A process for producing an electrode for an electric double layer capacitor as defined in claim 1, which comprises screw extrusion molding and rolling a mixture comprising a carbonaceous material, a polytetrafluoroethylene and a processing aid, followed by drying to remove the processing aid.

6. An electric double layer capacitor having a positive electrode and a negative electrode accommodated together with a non-aqueous electrolyte in a container, each of the positive and negative electrodes being an electrode made mainly of a carbonaceous material, wherein said electrode is a sheet electrode comprising a carbonaceous material and a polytetrafluoroethylene and having a K value which is calculated by the following formula from X-ray diffraction peak intensities measured by means of CuK$\alpha$-radiation of at most 20:

$$K=I_{PTFE}/(I_{CARBON}\times(C_{PTFE}/C_{CARBON}))$$

where $I_{PTFE}$ is the X-ray diffraction peak intensity of the polytetrafluoroethylene in the vicinity of $2\theta=18°$, $I_{CARBON}$ is the X-ray diffraction peak intensity of the carbonaceous material in the vicinity of $2\theta=43°$, $C_{PTFE}$ is the concentration by weight of the polytetrafluoroethylene in the electrode, and $C_{CARBON}$ is the concentration by weight of the carbonaceous material in the electrode.

7. The electric double layer capacitor according to claim 6, wherein the amount of the polytetrafluoroethylene contained in the electrode is from 1 to 40 wt %.

8. The electric double layer capacitor according to claim 6, wherein the carbonaceous material is a powder having a specific surface area of from 200 to 3,500 m$^2$/g.

9. The electric double layer capacitor according to claim 6, wherein the carbonaceous material comprises activated carbon having a particle size of from 0.1 to 100 $\mu$m and carbon black having a particle size of from 0.001 to 1 $\mu$m.

10. The electric double layer capacitor according to claim 6, wherein the non-aqueous electrolyte contains a salt comprising a quaternary onium cation represented by $R^1R^2R^3R^4N^+$ or $R^1R^2R^3R^4P^+$, wherein each of $R^1$, $R^2$, $R^3$ and $R^4$, which may be the same or different, is an alkyl group, and an anion selected from the group consisting of $BF_4^-$, $PF_6^-$, $ClO_4^-$ and $CF_3SO_3^-$.

11. The electric double layer capacitor according to claim 6, wherein the electrode for each of the positive and negative electrodes, is accommodated in the container in such a state as integrated with a current collector.

* * * * *